(12) United States Patent
Fu et al.

(10) Patent No.: US 12,722,158 B2
(45) Date of Patent: Sep. 1, 2026

(54) RECYCLING DEVICE

(71) Applicant: National University of Tainan, Tainan City (TW)

(72) Inventors: Yao-Hsien Fu, Kaohsiung City (TW); Chia-Tsung Hung, Tainan City (TW)

(73) Assignee: NATIONAL UNIVERSITY OF TAINAN, Tainan City (TW)

( * ) Notice: Subject to any disclaimer, the term of this patent is extended or adjusted under 35 U.S.C. 154(b) by 379 days.

(21) Appl. No.: 18/508,643

(22) Filed: Nov. 14, 2023

(65) Prior Publication Data

US 2025/0073725 A1 Mar. 6, 2025

(30) Foreign Application Priority Data

Aug. 29, 2023 (TW) ................................ 112132569

(51) Int. Cl.
*B02C 18/04* (2006.01)
*B02C 18/00* (2006.01)
*B09B 3/30* (2022.01)
*B09B 3/35* (2022.01)
*B09B 101/15* (2022.01)
*B09B 101/16* (2022.01)
*H10F 71/00* (2025.01)

(52) U.S. Cl.
CPC .......... *B02C 18/04* (2013.01); *B02C 18/0092* (2013.01); *B09B 3/35* (2022.01); *B09B 2101/15* (2022.01)

(58) Field of Classification Search
CPC . B02C 18/04; B02C 18/0092; B02C 18/2241; B02C 18/225
See application file for complete search history.

(56) References Cited

U.S. PATENT DOCUMENTS 5,211,280 A * 5/1993 Houde ............... B65G 21/2072 198/836.3

FOREIGN PATENT DOCUMENTS

CN 212399026 U * 1/2021
WO WO-2022167857 A1 * 8/2022 ............ H10F 71/00

OTHER PUBLICATIONS

English translate (CN212399026U), retrieved date Dec. 30, 2025.*
Extended European Search Report for European Application No. 23210420.8, dated Apr. 15, 2024.

* cited by examiner

*Primary Examiner* — Mohammed S. Alawadi
(74) *Attorney, Agent, or Firm* — Birch, Stewart, Kolasch & Birch, LLP

(57) ABSTRACT

A recycling device is adapted for recycling a solar panel, and includes a carriage module, at least one recycling module that is operable to conduct a physical recycling process for recycling the solar panel, and a recycling driving module. The at least one recycling module is operable to move from a cutter-retraction position, in which the at least one recycling module is distal from the carriage module, to a cutter-extension position, in which the at least one recycling module is proximate to the carriage module and abuts against the solar panel. When the at least one recycling module is in the cutter-extension position, the recycling driving module is operable to drive the at least one recycling module to move in a processing direction so that the at least one recycling module is further movable between a first position and a second position to conduct the physical recycling process.

13 Claims, 12 Drawing Sheets

RECYCLING DEVICE

CROSS-REFERENCE TO RELATED APPLICATION

This application claims priority to Taiwanese Invention Patent Application No. 112132569, filed on Aug. 29, 2023, the entire disclosure of which is incorporated by reference herein.

FIELD

The disclosure relates to a recycling device for recycling a solar cell module, and more particularly to a recycling device for recycling a solar panel of the solar cell module.

BACKGROUND

Nowadays, solar cell modules are one of the most common green energy devices. In order to prevent discarded solar cell modules from becoming a source of environmental pollution, many relevant industries have begun to develop a recycling process for recycling the discarded solar cell modules and turning them into usable resources. Generally, a solar cell module includes a solar panel that converts sunlight into electricity, a frame that surrounds a periphery of the solar panel, and junction boxes. The solar panel includes a back plate, a cover glass plate, and a plurality of silicon plates that are fixedly disposed between the back plate and the cover glass plate via an adhesive layer.

Currently, a major method for recycling the solar panel involves recycling each layer of materials in the solar panel through a chemical process or a thermal process. However, the chemical process involves using chemical solvents that will become liquid chemical waste after the chemical process is completed, and the liquid chemical waste may pollute the environment and is difficult to be recycled. The thermal process may cause unwanted energy waste due to heat dissipation. Furthermore, the thermal process may easily cause damage to the back plate or the cover glass plate, and the damage may even cause the back plate or the cover glass plate to generate toxic gases.

In addition, although there are some recycling devices that may recycle the solar panel through a physical recycling process, the physical recycling process generally requires the entire solar cell module to be fed into a recycling device. Because the entire solar cell module has an approximate dimension of 19,404 $cm^2$ (i.e., 196 cm×99 cm), the size of the entire recycling device needs to be relatively large as well.

SUMMARY

Therefore, an object of the disclosure is to provide a recycling device that can alleviate at least one of the drawbacks of the prior art.

According to the disclosure, the recycling device is adapted for recycling a solar panel of a solar cell module, and includes a frame mechanism, a feeding mechanism, and a recycling mechanism. The frame mechanism defines a recycling zone therein. The feeding mechanism is mounted to the frame mechanism, and includes a conveying module that is operable to convey the solar panel through the recycling zone, and a carriage module that is disposed in the recycling zone. The carriage module is adapted for carrying a pending section of the solar panel that is located in the recycling zone, and is operable to urge the pending section of the solar panel to abut thereagainst. The recycling mechanism is mounted to the frame mechanism, and includes at least one recycling module that is operable to conduct a physical recycling process for recycling the solar panel, and a recycling driving module that is connected to the at least one recycling module. The at least one recycling module is operable to move from a cutter-retraction position, in which the at least one recycling module is distal from the carriage module, to a cutter-extension position, in which the at least one recycling module is proximate to the carriage module and abuts against the pending section of the solar panel. When the at least one recycling module is in the cutter-extension position, the recycling driving module is operable to drive the at least one recycling module to move in a processing direction so that the at least one recycling module is further movable between a first position and a second position to conduct the physical recycling process for recycling the pending section of the solar panel.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
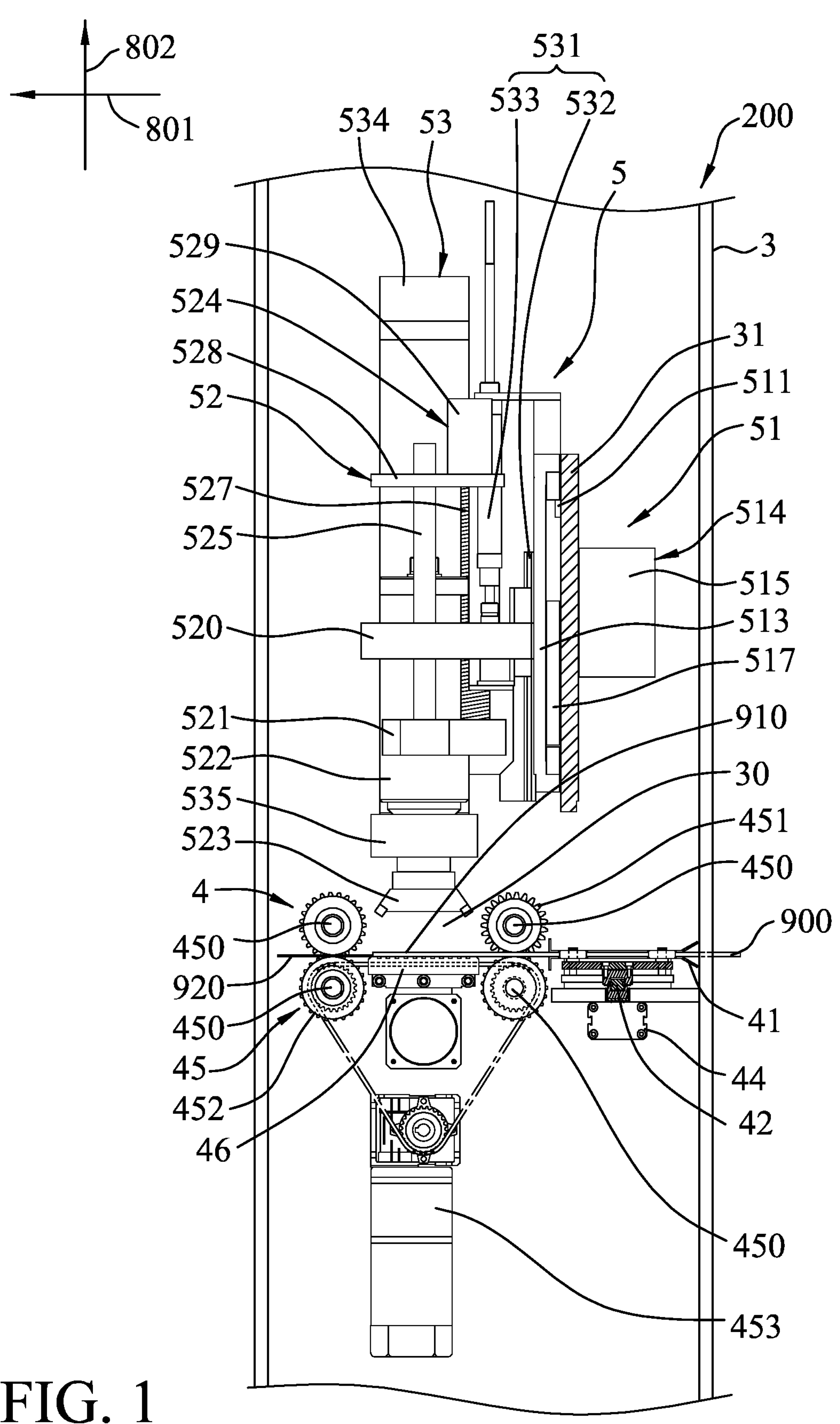
FIG. 1 is a fragmentary, sectional side view of an embodiment of a recycling device according to the disclosure.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
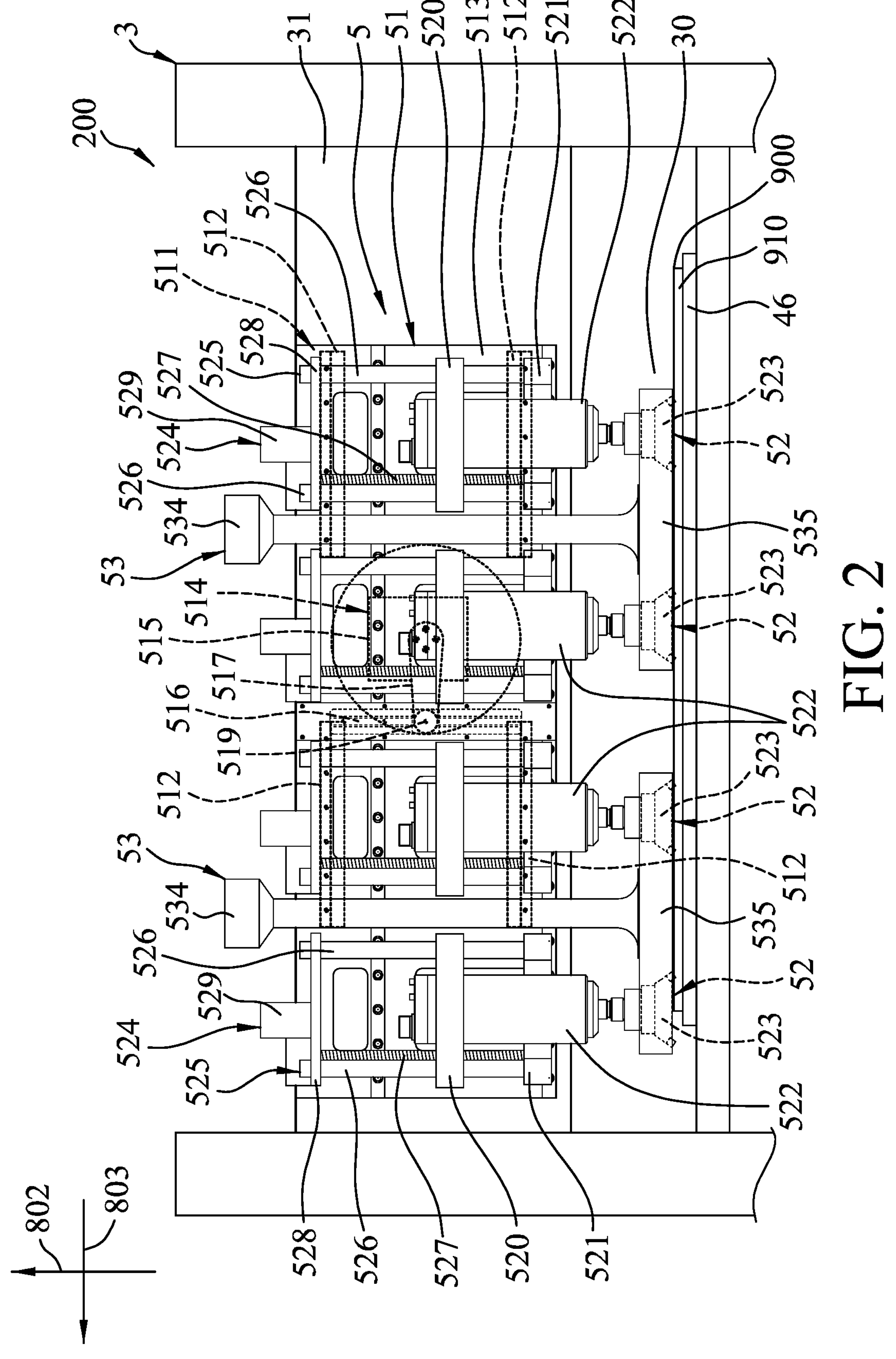
FIG. 2 is a fragmentary, sectional front view illustrating recycling modules of the embodiment in a first position.
Figure 3:
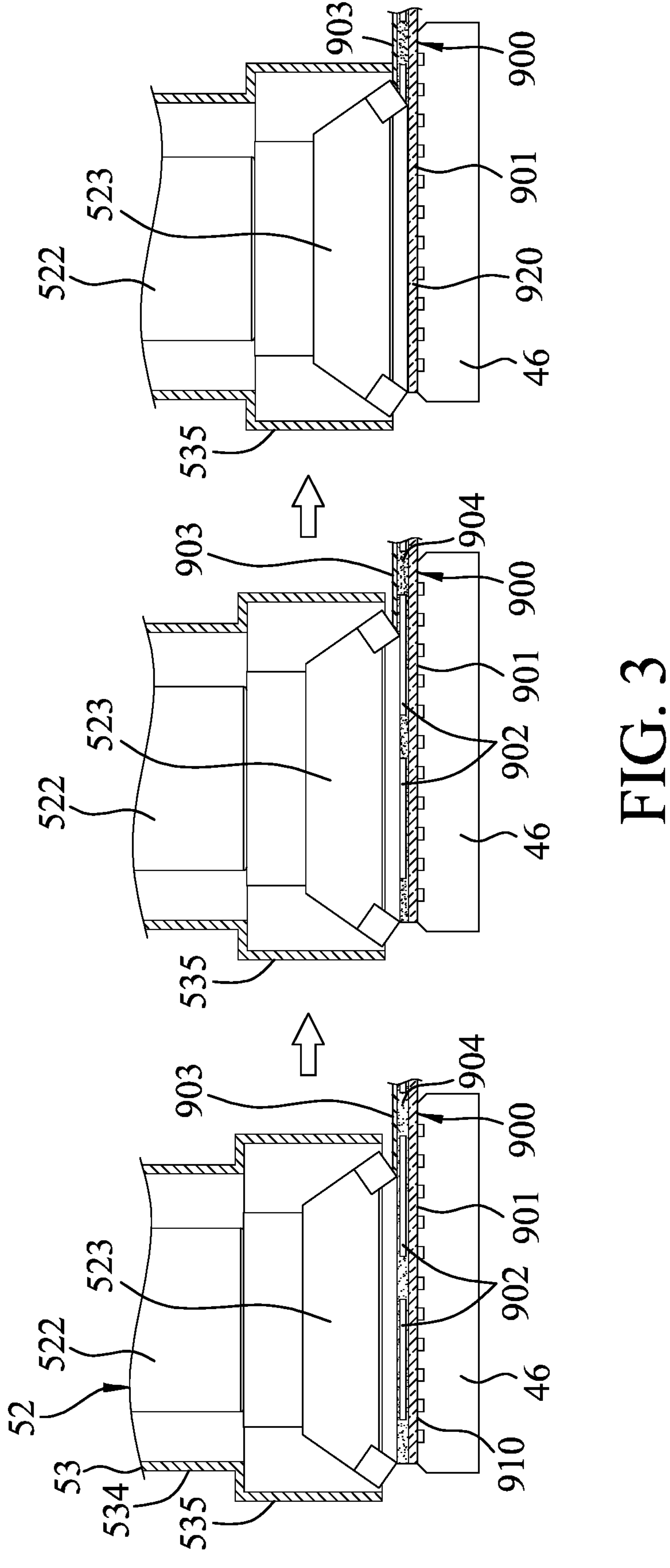
FIG. 3 is a schematic view illustrating one of the recycling modules conducting a physical recycling process on a solar panel.

Referring to FIGS. 1 to 3, an embodiment of a recycling device 200 according to the disclosure is adapted for recycling a solar panel 900 of a solar cell module via a physical recycling process. The physical recycling process may be, but is not limited to be, milling, grinding, etc.

The solar panel 900 is a component that is remained after a frame and junction boxes of the solar cell module are removed from the solar cell module. The solar panel 900 includes a cover glass plate 901, a plurality of silicon plates 902, and a back plate 903 that are stacked, and that are adhered to each other by an adhesive 904. The recycling device 200 is adapted for conducting the physical recycling process for recycling the back plate 903, the adhesive 904, and the silicon plates 902 of the solar panel 900. A section of the solar panel 900 that has undergone the physical recycling process includes the cover glass plate 901 and a remaining part of the adhesive 904, and is defined as a remainder section 920. It is noted that, even if the cover glass plate 901 of the solar panel 900 has cracked, the recycling device 200 is still adapted for conducting the physical recycling process for recycling the solar panel 900.

The recycling device 200 includes a frame mechanism 3, and a feeding mechanism 4 and a recycling mechanism 5 each of which is mounted to the frame mechanism 3. The frame mechanism 3 defines a recycling zone 30 therein, and includes a mounting frame 31. The recycling zone 30 is adapted for the physical recycling process that recycles the solar panel 900 to be conducted therein. Since the structure of the frame mechanism 3 may be of various known types, a detailed description thereof is omitted.

Figure 4:
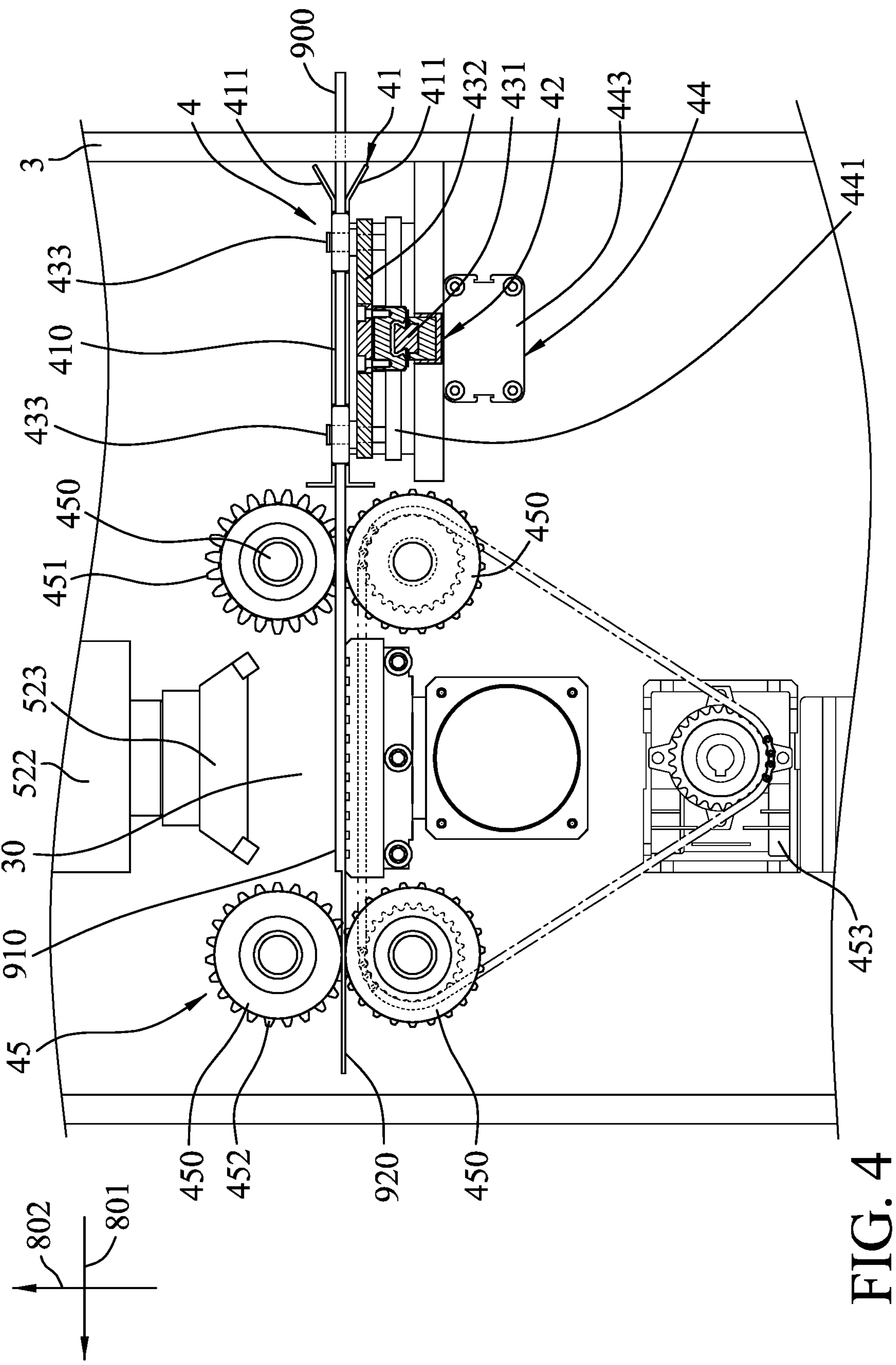
FIG. 4 is an enlarged view of part of FIG. 1.
Figure 5:
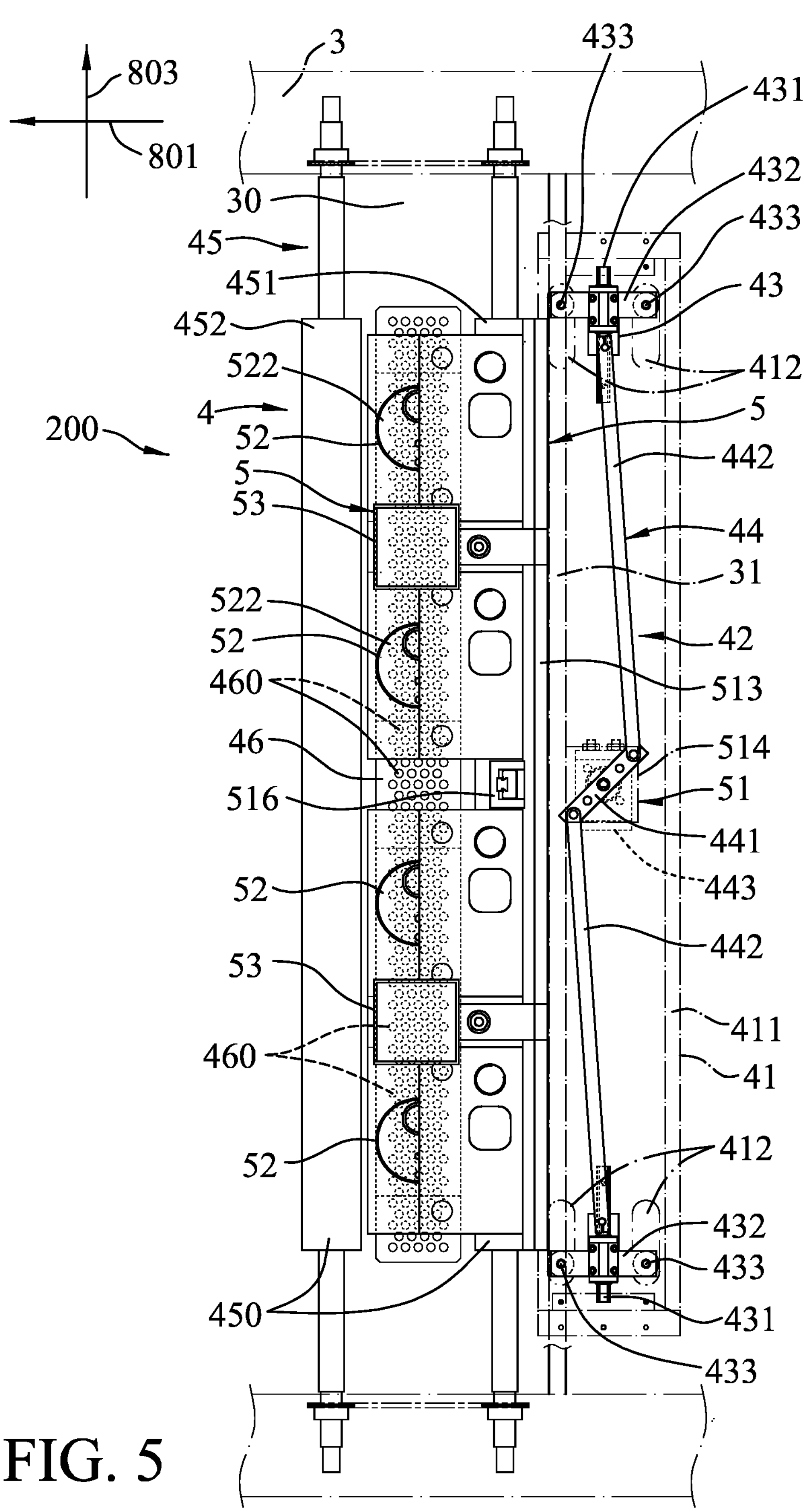
FIG. 5 is a fragmentary top view illustrating an orientation module of the embodiment.
Figure 6:
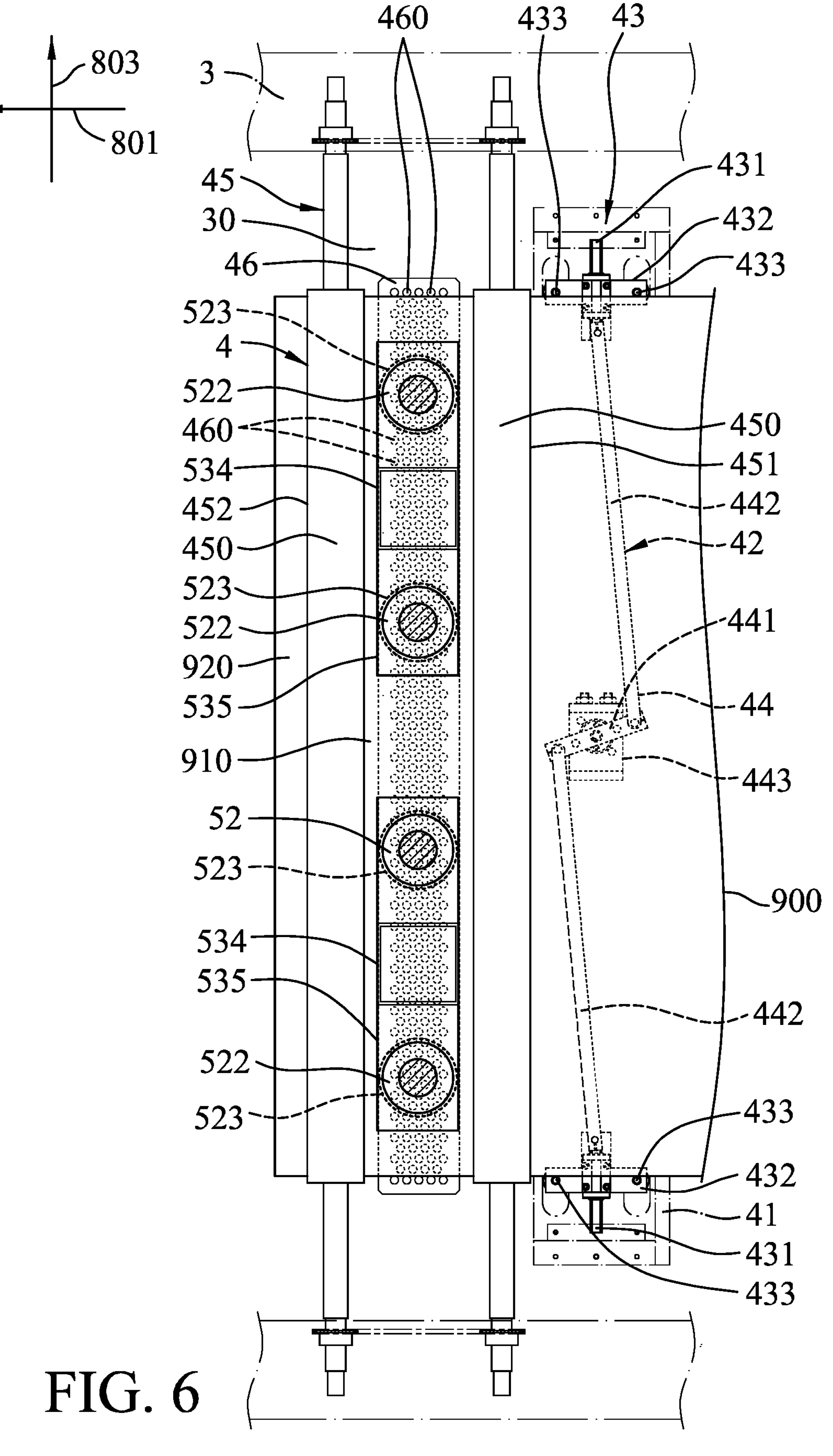
FIG. 6 is a view similar to FIG. 5, but illustrating the orientation module pushing two opposite sides of the solar panel.

Referring further to FIGS. 4 to 6, the feeding mechanism 4 includes a feeding guide module 41 that is mounted to the frame mechanism 3, an orientation module 42, a conveying module 45, and a carriage module 46 mounted on the frame mechanism 3.

The feeding guide module 41 includes two guide plates 411 that are spaced apart from each other in an up-down direction and that are parallel to each other. The guide plates 411 cooperatively define a feeding guide space 410 therebetween. The feeding guide space 410 extends horizontally, and is parallel to a conveying direction 801 that is parallel to a front-rear direction and that is orthogonal to the up-down direction, and a length thereof in the up-down direction is slightly greater than a thickness of the solar panel 900 in the up-down direction. Each of the guide plates 411 has four guide holes 412, each of which is elongated in a left-right direction orthogonal to the front-rear direction and the up-down direction. For each of the guide plates 411, the guide holes 412 are spaced apart from each other in both of the front-rear direction and the left-right direction, and extend through the guide plate 411 in the up-down direction. The feeding guide space 410 is adapted for the solar panel 900 to be inserted therein horizontally in the conveying direction 801, and for guiding the solar panel 900 horizontally toward the conveying module 45. The feeding guide space 410 spatially communicates with the guide holes 412 of each of the guide plates 411. When the solar panel 900 is inserted into the feeding guide space 410, by virtue of each of the guide plates 411 having the guide holes 412, two opposite sides of the solar panel 900 in the left-right direction are exposed from the guide holes 412 of the guide plates 411.

The orientation module 42 includes an orientation rail unit 43 that is mounted to the frame mechanism 3 and that is located below the feeding guide module 41, two orientation seats 432 that are mounted to the orientation rail unit 43 and that are located below the feeding guide module 41, and an orientation driving unit 44 that is mounted to the frame mechanism 3 and that interconnects the orientation seats 432. The orientation rail unit 43 includes two orientation rails 431 that are elongated in a processing direction 803 orthogonal to the conveying direction 801 and the up-down direction (i.e., the processing direction 803 is parallel to the left-right direction), and that are spaced apart from each other in the left-right direction. The orientation seats 432 are respectively mounted to the orientation rails 431. Each of the orientation seats 432 includes two push members 433 that are spaced apart from each other in the front-rear direction, that are columnar, and that are upright. Each of the push members 433 of the orientation seats 432 extends upwardly through a respective one of the guide holes 412 of an upper one of the guide plates 411. Each of the orientation seats 432 is movable relative to the respective one of the orientation rails 431 in the processing direction 803. When the orientation seats 432 are urged to respectively move along the orientation rails 431 in the left-right direction, each of the push members 433 of the orientation seats 432 moves along the respective one of the guide holes 412 of the upper one of the guide plates 411 in the left-right direction.

The orientation driving unit 44 includes a rotary seat 441 that is mounted to the frame mechanism 3 and that is rotatable about an imaginary up-down axis (not shown) extending in a cutter-moving direction 802 which is parallel to the up-down direction, two transmission rods 442, and a seat rotation driver 443 that is coupled to the rotary seat 441. Each of the transmission rods 442 interconnects the rotary seat 441 and a respective one of the orientation seats 432, and the transmission rods 442 are disposed diametrically opposite to each other. The orientation driving unit 44 is operable to drive the orientation seats 432 to move toward each other along the orientation rail unit 43, thereby pushing the opposite sides of the solar panel 900 in the processing direction 803. Specifically, the rotary seat 441 is rotated by the seat rotation driver 443 to move synchronously the orientation seats 432 through the transmission rods 435 along the orientation rails 431 in opposite directions. By virtue of the orientation seats 432 being driven to move close to each other in the left-right direction (i.e., the processing direction 803), left and right sides of the solar panel 900 are thereby pushed by the push members 433 of the orientation seats 432 to regulate orientation of the solar panel 900.

In certain embodiments, the number of the push members 433 of each of the orientation seats 432 may not be limited to two, and each of the push members 433 may be of another type. For example, each of the push members 433 may be configured to be a plate.

The conveying module 45 is operable to convey the solar panel 900 through the recycling zone 30. The conveying module 45 includes a feed conveying unit 451 and a discharge conveying unit 452 that are mounted to the frame mechanism 3 and that are spaced apart from each other in the conveying direction 801, and a conveying driving unit 453 that is mounted to the frame mechanism 3 and that interconnects the feed conveying unit 451 and the discharge conveying unit 452. The feed conveying unit 451 and the discharge conveying unit 452 are respectively located at two opposite sides of the recycling zone 30 in the conveying direction 801, and are synchronously driven by the conveying driving unit 453 so that the feed conveying unit 451 is operable to convey the solar panel 900 in the conveying direction 801 and that the discharge conveying unit 452 is operable to convey the remainder section 920 of the solar panel 900 (i.e., the section of the solar panel 900 that has undergone the physical recycling process) in the conveying direction 801.

In this embodiment, each of the feed conveying unit 451 and the discharge conveying unit 452 includes two rollers 450 that extend in the left-right direction, that are spaced apart from each other in the up-down direction, and that are parallel to each other. The rollers 450 of the feed conveying unit 451 are adapted for respectively pressing a top portion and a bottom portion of the solar panel 900 to cooperatively hold the solar panel 900 while conveying the solar panel 900 in the conveying direction 801. Rotations of the rollers 450 of the feed conveying unit 451 urge the solar panel 900 to enter the recycling zone 30 in the conveying direction 801. A section of the solar panel 900 that is located in the recycling zone 30 is defined as a pending section 910 of the solar panel 900. The rollers 450 of the discharge conveying unit 452 are adapted for respectively pressing a top portion and a bottom portion of the remainder section 920 of the solar panel 900 to hold the remainder section 920 while conveying the remainder section 920 in the conveying direction 801. In this embodiment, a speed at which the discharge conveying unit 452 conveys the remainder section 920 of the solar panel 900 is greater than a speed at which the feed conveying unit 451 conveys the solar panel 900 so that the feed and discharge conveying units 451, 452 may cooperatively strain the pending section 910 in the front-rear direction. However, in certain embodiments, each of the feed and discharge conveying units 451, 452 may be conducted in a variety of forms.

The carriage module 46 is disposed in the recycling zone 30, is located between the feed conveying unit 451 and the discharge conveying unit 452 (i.e., the feed conveying unit 451 and the discharge conveying unit 452 are disposed on two opposite sides of the carriage module 46 in the conveying direction 801), and is adapted for carrying the pending section 910 of the solar panel 900. In this embodiment, the carriage module 46 has a plurality of suction holes 460 that are disposed on a top surface thereof and that open toward the pending section 910 of the solar panel 900. The carriage module 46 is connected to a suction machine (not shown). When the carriage module 46 is driven by the suction machine, the carriage module 46 is operable to discharge air in the recycling zone 30 via the suction holes 460 at negative air pressure so that the pending section 910 of the solar panel 900 may be urged to abut against the top surface of the carriage module 46. Consequently, by virtue of the carriage module 46 urging the pending section 910 to abut thereagainst, and by virtue of the feed and discharge conveying units 451, 452 cooperatively straining the pending section 910 in the front-rear direction, the pending section 910 may be flat and smooth. However, the carriage module 46 may be conducted in a variety of forms to restrain movement of the pending section 910 and to urge the pending section 910 to abut thereagainst. For example, in one embodiment, the carriage module 46 may be in the form of a movable fixture that securely locates the pending section 910 to urge the pending section 910 to abut the top surface thereof. Other types of the carriage module 46 may be alternatively provided.

Referring back to FIGS. 1, 2 and 4, the recycling mechanism 5 includes a recycling driving module 51 that is mounted to the frame mechanism 3 and that is located above the carriage module 46, four recycling modules 52 that are mounted to the recycling driving module 51, and two suction modules 53 that are mounted to the recycling driving module 51.

Figure 7:
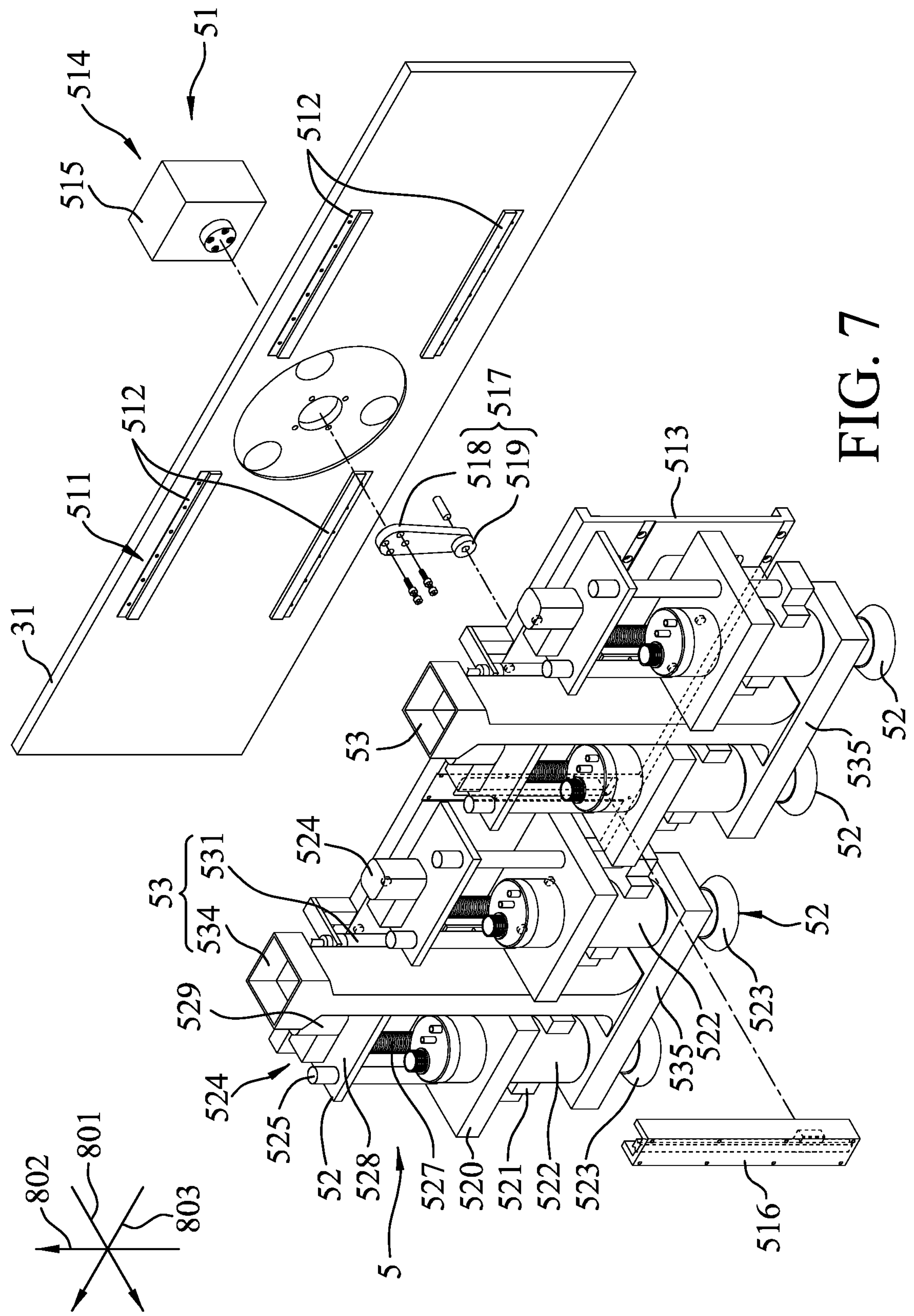
FIG. 7 is a partly exploded perspective view of a recycling mechanism of the embodiment.
Figure 8:
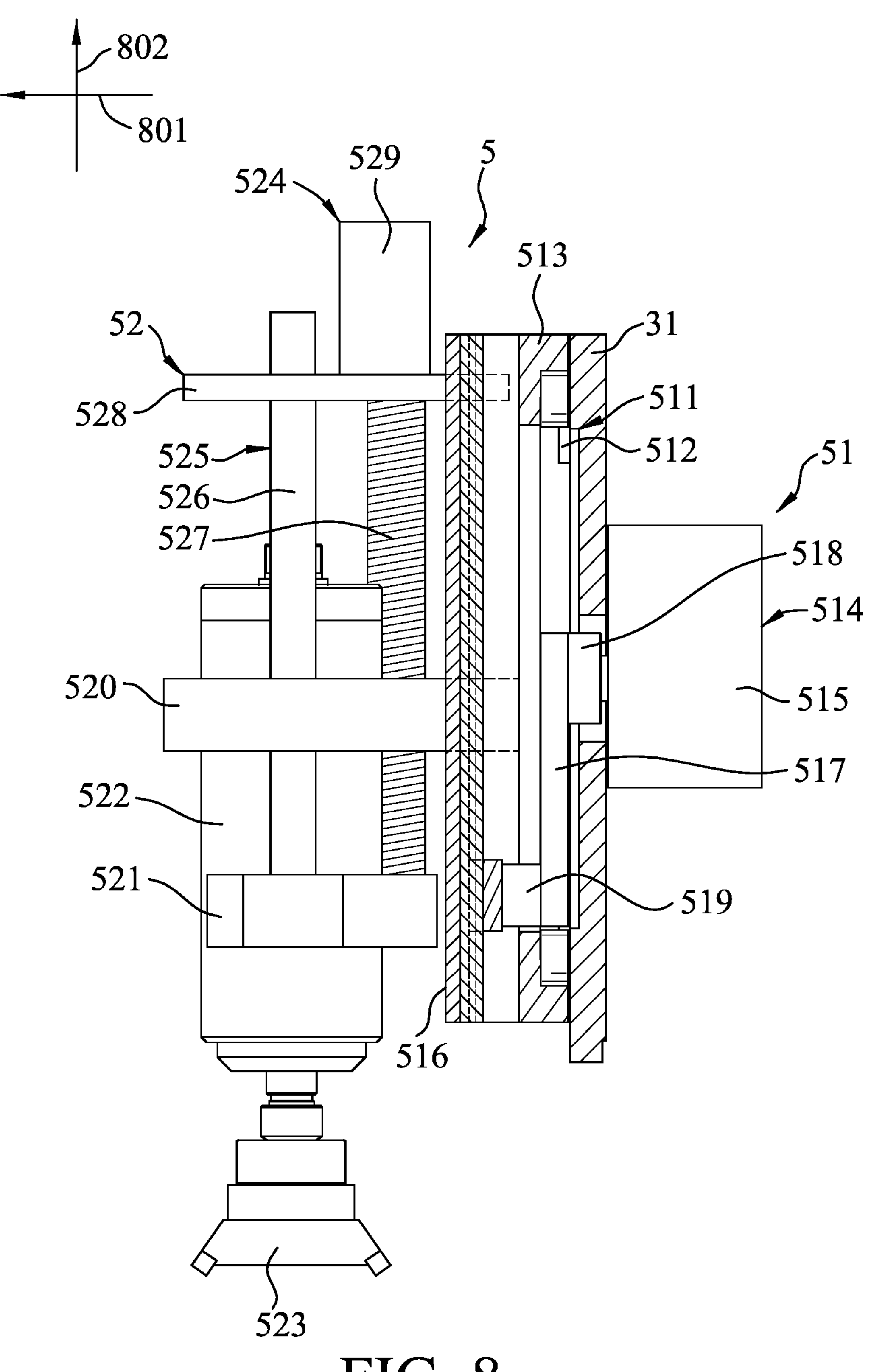
FIG. 8 is a sectional side view of a recycling driving module of the recycling mechanism and one of the recycling modules.

Referring further to FIGS. 7 and 8, in cooperation with FIG. 2, the recycling driving module 51 includes a slide rail unit 511 that is mounted to the mounting frame 31 of the frame mechanism 3 and that is elongated in the processing direction 803, a moving seat 513 that is mounted to the slide rail unit 511, and a first driving unit 514 that is mounted to the frame mechanism 3 and that is connected to the moving seat 513. The recycling modules 52 and the suction modules 53 are mounted to the moving seat 513. The slide rail unit 511 includes four slide rails 512 that are elongated in the left-right direction, that are spaced apart from each other in both of the up-down direction and the left-right direction, and that are symmetrically mounted to the frame mechanism 3. The moving seat 513 is movably mounted to the slide rails 512 so as to be movable along the slide rails 512 in the left-right direction.

The first driving unit 514 includes a first driver 515 that is mounted to the frame mechanism 3, a guide rail 516 that is mounted to the moving seat 513 and that is elongated in the cutter-moving direction 802 (i.e., the up-down direction), and a swing arm 517 that is rotatably disposed between the first driver 515 and the guide rail 516. The swing arm 517 has a connecting end 518 that is mounted to the first driver 515, and a swing end 519. The swing arm 517 is rotatable about a rotation axis (not shown) that extends through the connecting end 518 in the conveying direction 801. The conveying direction 801 is orthogonal to the processing direction 803 and the cutter-moving direction 802. The first driver 515 includes a motor and a reduction gear, and is operable to drive the swing arm 517 to rotate. When the swing arm 517 rotates about the rotation axis, the swing end 519 of the swing arm 517 rotates relative to the guide rail 516 and moves along the guide rail 516 in the cutter-moving direction 802.

Figure 9:
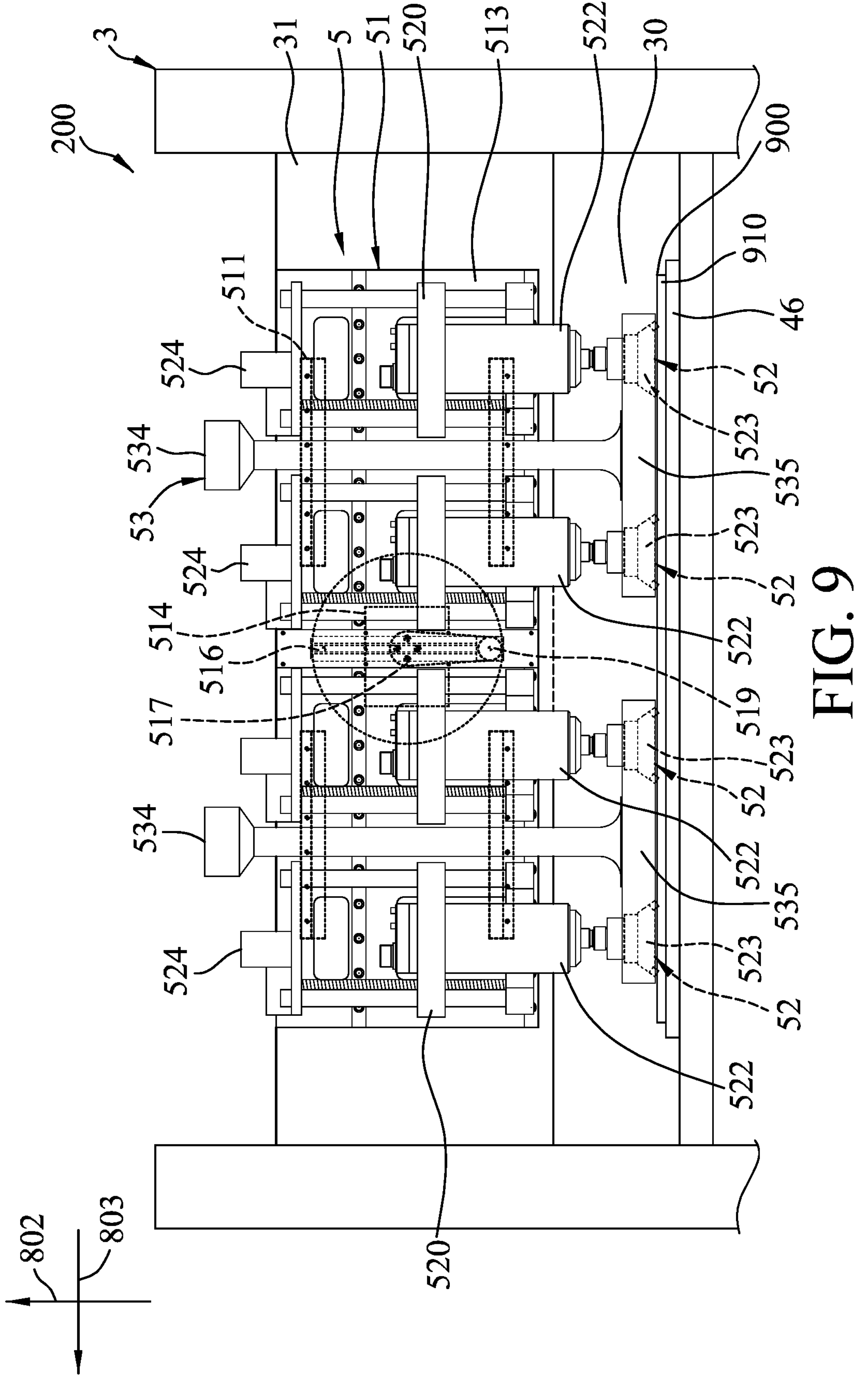
FIG. 9 is a view similar to FIG. 2, but illustrating the recycling modules urged to move away from the first position and toward a second position.
Figure 10:
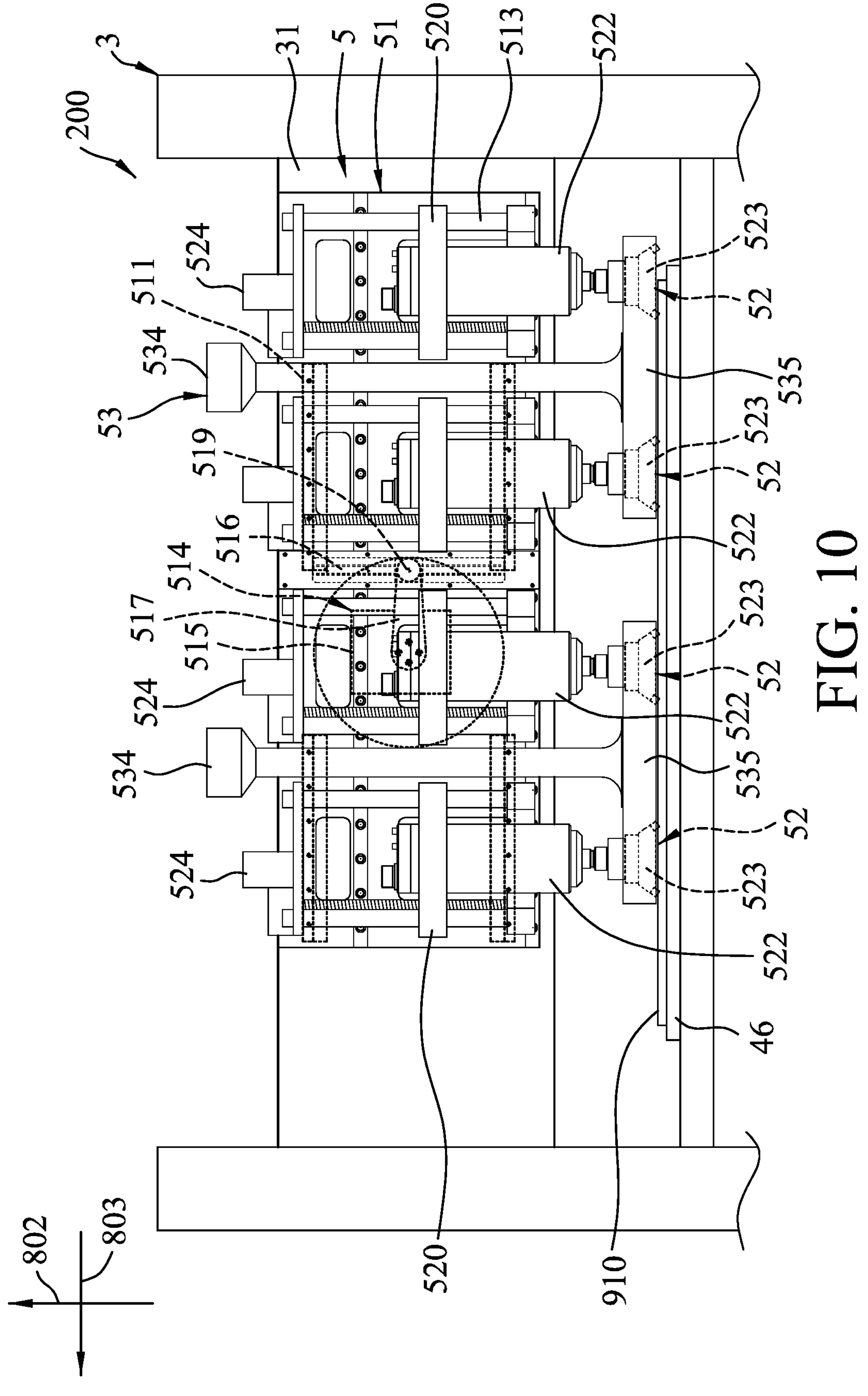
FIG. 10 is a view similar to FIG. 9, but illustrating the recycling modules in the second position.

Referring further to FIGS. 9 and 10, in cooperation with FIG. 2, when the swing arm 517 is driven by the first driver 515 to rotate and when the swing end 519 of the swing arm 517 moves along the guide rail 516 in the up-down direction, the guide rail 516 is urged by movement of the swing arm 517 to move in the processing direction 803 so that the moving seat 513 to which the guide rail 516 is mounted may be urged to move along the slide rails 512 in the processing direction 803 and that the recycling modules 52 mounted to the moving seat 513 may be urged to move between a first position (see FIG. 2) and a second position (see FIG. 10) in the processing direction 803 (i.e., the first driving unit 514 is operable to drive the moving seat 513 to move along the slide rail unit 511 in the processing direction 803 so that the recycling modules 52 mounted to the moving seat 513 may be urged to move between the first position and the second position). In this embodiment, the recycling modules 52 are in the first position when the swing arm 517 is in a horizontal position as shown in FIG. 2, and, when the swing arm 517 is driven to rotate by 360 degrees from the horizontal position, the recycling modules 52 are urged to move from the first position to the second position and then from the second position back to the first position.

Each of the recycling modules 52 is operable to conduct the physical recycling process for recycling the pending section 910 of the solar panel 900. When the recycling modules 52 are driven by the recycling driving module 51 to move between the first position and the second position, the recycling modules 52 move along the pending section 910 of the solar panel 900 in the left-right direction so that the recycling modules 52 may respectively conduct the physical recycling process on four different parts of the pending section 910 in the left-right direction to recycle the pending section 910.

The recycling modules 52 are mounted to the moving seat 513, are spaced apart from each other in the processing direction 803, are located in the recycling zone 30, and are located above and spaced apart from the carriage module 46. The suction modules 53 are mounted to the moving seat 513, are spaced apart from each other in the processing direction 803, are located in the recycling zone 30, and are located above and spaced apart from the carriage module 46. Since the structure of each of the recycling modules 52 is the same, and since the structure of each of the suction modules 53 is the same, only one of the recycling modules 52 and one of the suction modules 53 will hereafter be elaborated.

Referring back to FIGS. 2, 7, and 8, the recycling module 52 includes a base seat 520 that is mounted to the moving seat 513, a cutter seat 521 that is spaced apart from and located below the base seat 520 in the cutter-moving direction 802, a cutter unit 522 that is mounted to the cutter seat 521, and a cutter driving unit 524 that is disposed on the base seat 520 and the cutter seat 521. The cutter unit 522 includes a cutter head 523 that is operable to conduct the physical recycling process for recycling the pending section 910 of the solar panel 900. In this embodiment, the cutter head 523 is configured to be a milling head, but in certain embodiments, the cutter head 523 may be configured to be a grinding head.

The cutter driving unit 524 includes a guide subunit 525 that is mounted to the base seat 520, that is movable relative to the base seat 520 in the cutter-moving direction 802, and that is connected to the cutter seat 521, a threaded rod 527 that is elongated and extends through the base seat 520 in the cutter-moving direction 802, that is threadedly connected to the base seat 520, and that has a bottom end connected to the cutter seat 521 (i.e., the cutter seat 521 interconnects the guide subunit 525 and the threaded rod 527), a connecting seat 528 that is mounted to a top end of the guide subunit 525 and a top end of the threaded rod 527, and a cutter driver 529 that is mounted to the connecting seat 528 and that is connected to the threaded rod 527. The guide subunit 525 includes two guide rods 526. Each of the guide rods 526 is elongated and extends through the base seat 520 in the cutter-moving direction 802, is movable relative to the base seat 520 in the cutter-moving direction 802, and interconnects the cutter seat 521 and the connecting seat 528.

The cutter driver 529 is a servo motor, and is operable to drive the threaded rod 527 to turn relative to the base seat 520 so that the threaded rod 527 may move relative to the base seat 520 in the cutter-moving direction 802 and urge the guide rods 526, the cutter seat 521, and the cutter unit 522 to move between a cutter-retraction position and a cutter-extension position. Specifically, because the cutter unit 522 is mounted to the cutter seat 521, when the cutter seat 521 is driven by the cutter driving unit 524 to move relative to the base seat 520 in the cutter-moving direction 802, the cutter seat 521 urges the cutter unit 522 to move between the cutter-retraction position, in which the cutter unit 522 is distal from the carriage module 46, and the cutter-extension position, in which the cutter unit 522 is proximate to the carriage module 46 and abuts against the pending section 910 of the solar panel 900. In addition, when the cutter unit 522 is in the cutter-extension position, the recycling driving module 51 is operable to drive the recycling module 52 to move between the first position and the second position so as to conduct the physical recycling process for recycling the pending section 910 of the solar panel 900. The cutter driver 529 is further operable to adjust the cutter-extension position of the cutter unit 522, according to a thickness of the pending section 910 of the solar panel 900 that is undergoing the physical recycling process in the up-down direction, thereby adjusting a distance between the cutter unit 522 and the carriage module 46 when the cutter unit 522 is in the cutter-extension position.

Referring back to FIG. 3, in this embodiment, the recycling modules 52 conduct the physical recycling process on the pending section 910 of the solar panel 900 layer-by-layer. Specifically, the recycling modules 52 conduct the physical recycling process sequentially on the back plate 903, on the adhesive 904 that is located between the back plate 903 and a layer in which the silicon plates 902 are located, on the layer in which the silicon plates 902 are located, and on the adhesive 904 that is located between the layer in which the silicon plates 902 are located and the cover glass plate 901. Thus, the cutter-extension position of the cutter unit 522 of each of the recycling modules 52 is gradually lowered during the physical recycling process.

Figure 11:
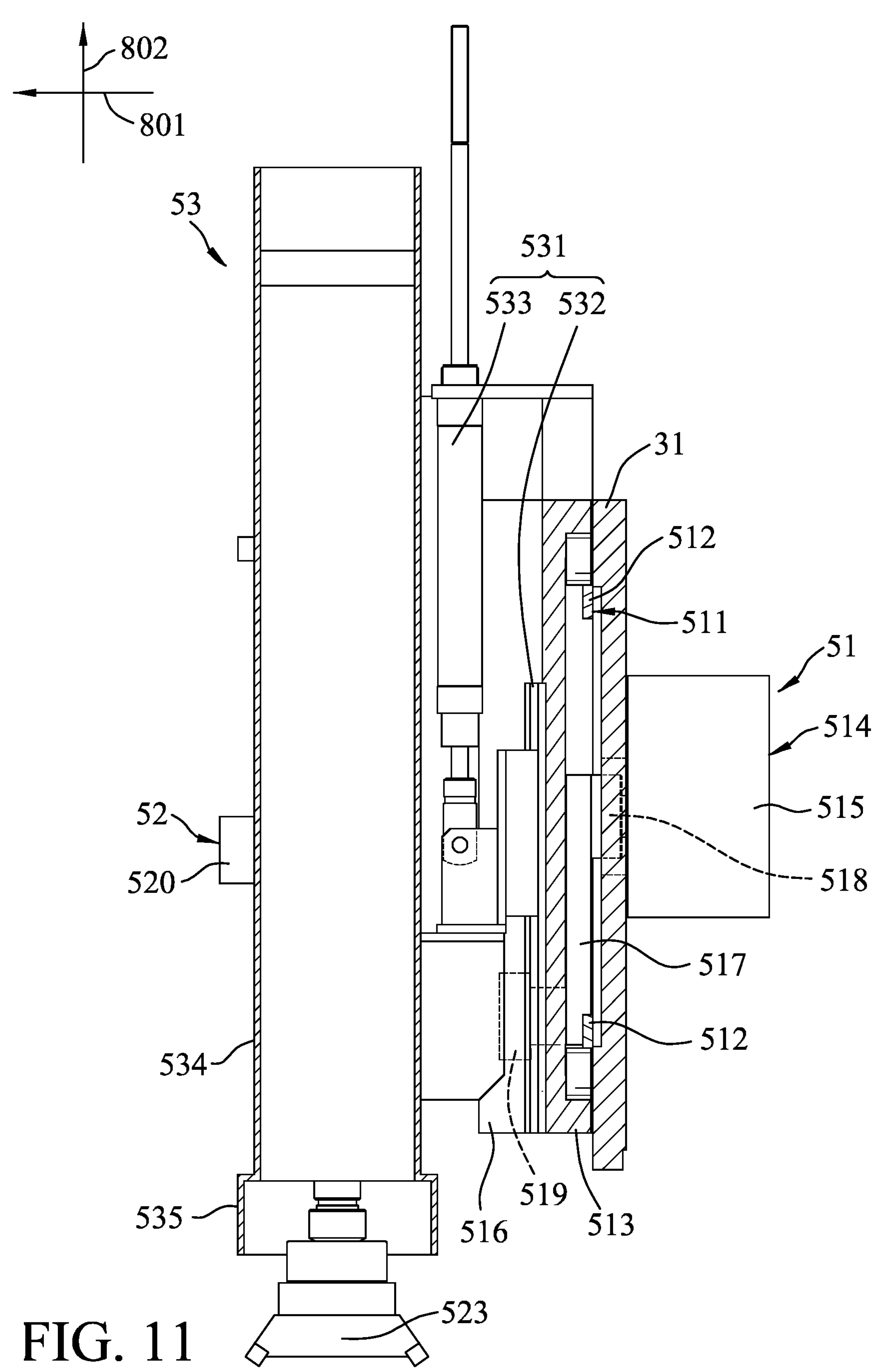
FIG. 11 is a sectional side view of a suction module of the recycling mechanism.
Figure 12:
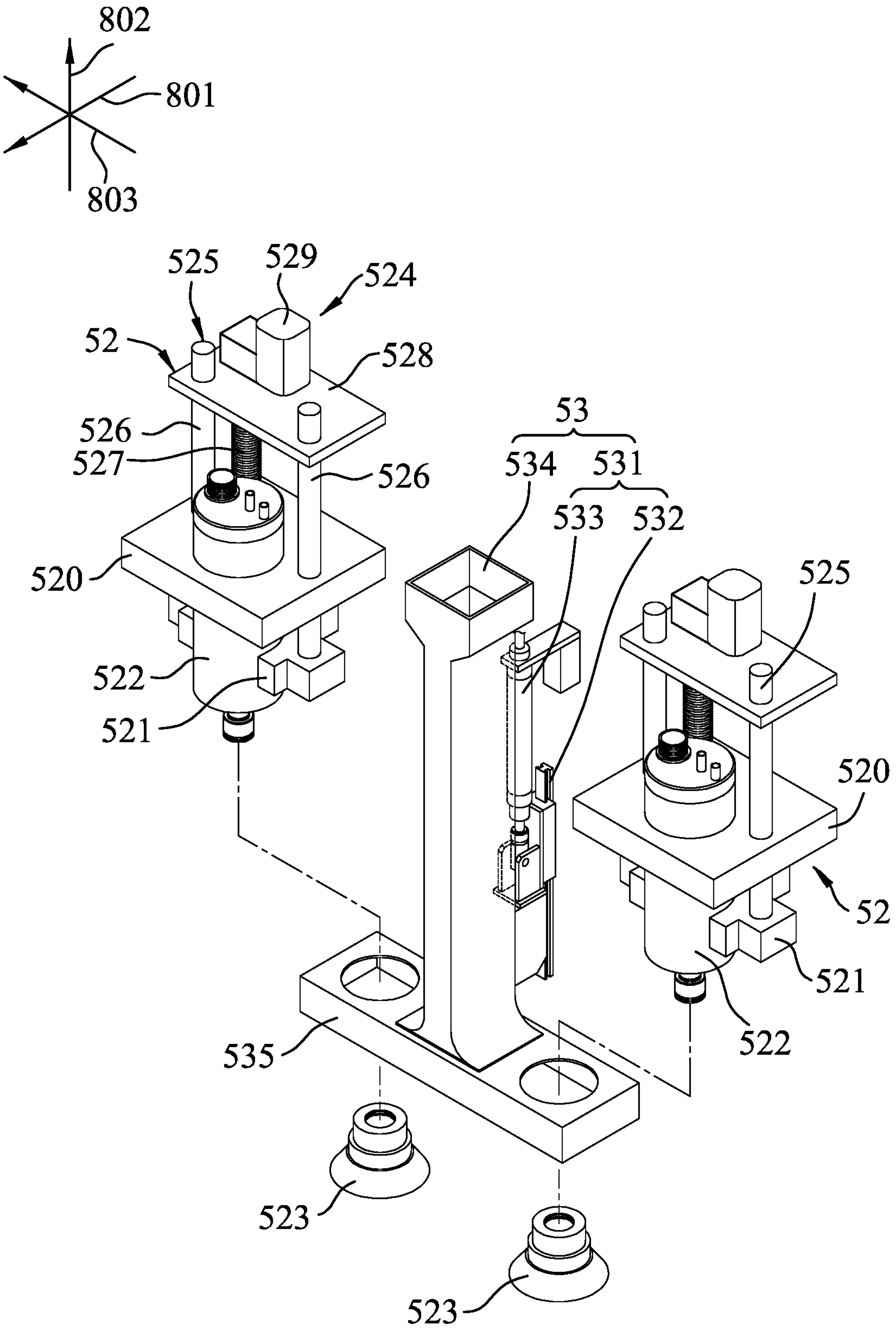
FIG. 12 is a partly exploded perspective view of an assembly of the suction module and two of the recycling modules.

Referring further to FIGS. 11 and 12, in cooperation with FIG. 7, the suction module 53 includes an adjustment unit 531 that is mounted to the moving seat 513, and a suction hood 534 that is mounted to the adjustment unit 531, that has an opening, and that has a hood body portion 535 defining the opening. The hood body portion 535 of one of the suction modules 53 of the recycling mechanism 5 surrounds the cutter units 522 of two of the recycling modules 52 of the recycling mechanism 5, and the hood body portion 535 of another one of the suction modules 53 of the recycling mechanism 5 surrounds the cutter units 522 of the remaining two of the recycling modules 52 of the recycling mechanism 5.

The adjustment unit 531 includes an adjustment rail 532 that is mounted to the moving seat 513 and that is elongated in the cutter-moving direction 802, and an adjustment driver 533 that is disposed between the moving seat 513 and the suction hood 534. The suction hood 534 is mounted to the adjustment rail 532. The adjustment driver 533 of each of the suction modules 53 is operable to drive the suction hood 534 of the suction module 53 to move along the adjustment rail 532 of the suction module 53 in the cutter-moving direction 802 between a separation position, in which the suction hood 534 of the suction module 53 is located above the cutter heads 523 of the corresponding two of the recycling modules 52 and is distal from the carriage module 46, and a suction position, in which the suction hood 534 of the suction module 53 is proximate to the carriage module 46 so that the opening of the suction hood 534 of the suction module 53 may face the carriage module 46 and that the suction hood 534 of the suction module 53 may cover the cutter heads 523 of the corresponding two of the recycling modules 52. The suction hood 534 of each of the suction modules 53 is adapted to be connected to a suction machine (not shown) so that when the suction hood 534 of the suction module 53 is driven by the suction machine, the suction hood 534 of the suction module 53 is operable to discharge air via the opening thereof at the negative air pressure. Therefore, when the recycling modules 52 conduct the physical recycling process, chips that are generated during the physical recycling process may be sucked by the suction hoods 534 of the suction modules 53, and airflow that cools the cutter heads 523 of the recycling modules 52 may be generated to facilitate heat dissipation of the cutter heads 523.

Referring back to FIGS. 4 to 6, when the recycling device 200 is in operation, the recycling device 200 is adapted to be in signal connection with a control device (not shown) so as to be controlled and operated, by a physical recycling processing parameter that is received by the control device, to conduct the physical recycling process. The physical recycling processing parameter may be, but not limited to be, a distance between a surface of the back plate 903 that faces away from the cover glass plate 901 and a surface of the cover glass plate 901 that faces away from the back plate 903 in the up-down direction, a distance between a surface of each of the silicon plates 902 that faces away from the cover glass plate 901 and the surface of the cover glass plate 901 that faces away from the silicon plates 902 in the up-down direction, a thickness of the cover glass plate 901 in the up-down direction, etc.

In addition, when the recycling device 200 conducts the physical recycling process, the recycling device 200 is operable to conduct the physical recycling process in a stepwise manner or a continuous manner.

When the recycling device 200 conducts the physical recycling process in the stepwise manner, the solar panel 900 is horizontally inserted into the feeding guide space 410 in the conveying direction 801 while the back plate 903 faces upwardly. At this time, the feeding guide module 41 carries the solar panel 900 and guides the solar panel 900 to the conveying module 45 in the conveying direction 801, and the orientation module 42 pushes the opposite sides of the solar panel 900 in the processing direction 803 for adjusting orientation of the solar panel 900. Next, the feed conveying unit 451 intermittently conveys the solar panel 900 toward the recycling zone 30 in the conveying direction 801 so that the pending section 910 of the solar panel 900 that is located in the recycling zone 30 may increase intermittently. Then, when the conveying module 45 ceases to convey the solar panel 900, the carriage module 46 that carries the pending section 910 sucks a bottom surface of the pending section 910 so as to position the pending section 910 and to urge the pending section 910 to abut thereagainst.

Referring back to FIGS. 2, 3, 9, and 10, afterwards, the cutter driving unit 524 of each of the recycling modules 52 drives the cutter unit 522 of the recycling module 52 to move to the cutter-extension position, in which the cutter unit 522 of the recycling module 52 is operable to mill the back plate 903 of the pending section 910 of the solar panel 900, and the recycling modules 52 are urged by the first driving unit 514 to move from the first position to the second position such that the cutter units 522 of the recycling modules 52 synchronously mill the back plate 903 of the pending section 910. At the same time, the adjustment unit 531 of each of the suction modules 53 drives the suction hood 534 of the suction module 53 to move downwardly to the suction position, in which the suction hood 534 of the suction module 53 is proximate to a top surface of the pending section 910 and covers the cutter heads 523 of the corresponding two of the recycling modules 52, and the suction machine that is connected to the suction hood 534 of each of the suction modules 53 drives the suction hoods 534 of the suction modules 53 to suck chips that are generated during the milling.

The cutter units 522 mill one of layers in a layered structure of the pending section 910 when the recycling modules 52 are moved from one of the first position and the second position to another one of the first position and the second position. Every time after the recycling modules 52 are moved from one of the first position and the second position to another one of the first position and the second position, the cutter-extension position of the cutter units 522 is lowered so that the cutter heads 423 of the cutter units 522 may be moved downwardly to abut against the pending section 910. Then, the recycling modules 52 are moved between the first and second positions again so that the cutter units 522 may mill another one of the layers in the layered structure of the pending section 910. Thus, the back plate 903, the adhesive 904, and the silicon plates 902 of the pending section 910 are milled and recycled layer-by-layer.

When the pending section 910 has undergone the physical recycling process, the pending section 910 only includes the cover glass plate 901 and a part of the adhesive 904 that is remained, and is defined as the remainder section 920. When the pending section 910 becomes the remainder section 920 after the physical recycling process, the cutter driving units 524 drive the cutter units 522 to move upwardly to the cutter-retraction position, and, at this time, the adjustment units 531 drive the suction hoods 534 to move upwardly to the separation position and the carriage module 46 releases the remainder section 920.

Then, the feed conveying unit 451 conveys the solar panel 900 into the recycling zone 30 in the conveying direction 801 again so as to urge the remainder section 920 of the solar panel 900 that is located in the recycling zone 30 to leave the recycling zone 30 in the conveying direction 801, and a section of the solar panel 900 that is just conveyed into the recycling zone 30 becomes another pending section 910. At this time, the discharge conveying unit 452 begins to hold and convey the remainder section 920 that leaves the recycling zone 30 in the conveying direction 801, and cooperates with the feed conveying unit 451 to strain the another pending section 910 in the front-rear direction. Afterwards, the recycling mechanism 5 conducts the physical recycling process on the another pending section 910 so that the another pending section 910 may become another remainder section 920 after the physical recycling process.

By repeatedly conducting the physical recycling process that sequentially mills the back plate 903, the adhesive 904, and the silicon plates 902 of the pending section 910, the recycling device 200 recycles the solar panel 900 in the stepwise manner so that a layer of a complete cover glass plate 901 may be obtained.

When the recycling device 200 conducts the physical recycling process in the continuous manner, the conveying module 45 conveys the solar panel 900 in the conveying direction 801 at a predetermined speed continuously, and the cutter units 522 are kept in the cutter-extension position while the recycling modules 52 are urged to continuously move between the first and second positions so as to continuously mill the pending section 910. Consequently, the solar panel 900 enters the recycling zone 30 and becomes the pending section 910 in the recycling zone 30 without a pause, and the pending section 910 that is in the recycling zone 30 becomes the remainder section 920 via the physical recycling process without a pause. When the solar panel 900 is continuously conveyed in the conveying direction 801, the pending section 910 is strained by the feed and discharge conveying units 451, 452 since there is a difference of the conveying speed between the feed and discharge conveying units 451, 452, and the pending section 910 is urged to abut against the top surface of the carriage module 46 by the negative air pressure that is generated by the carriage module 46 and the suction machine connected to the carriage module 46.

Even if the cover glass plate 901 of the solar panel 900 has cracked and cracks that appear in the cover glass plate 901 have reduced the stiffness of the solar panel 900 before the physical recycling process, by virtue of the carriage module 46 carrying and sucking the pending section 910, the pending section 910 may still be positioned in the recycling zone 30 while being flat and smooth. Thus, the physical recycling process may still be conducted successfully. Moreover, because the remainder section 920 includes the remaining part of the adhesive 904 that covers the cracked cover glass plate 901, the cracked cover glass plate 901 of the remainder section 920 may not immediately shatter into pieces when the remainder section 920 leaves the recycling zone 30.

In this embodiment, the recycling device 200 includes four recycling modules 52 each of which is movable in the processing direction 803 between its first and second positions in a predetermined area so that the recycling modules 52 may respectively mill different areas of the pending section 910 to cooperatively complete the physical recycling process on the whole pending section 910. The time needed for the physical recycling process may thus be shortened. However, the number of the recycling modules 52 may be increased or reduced according to actual requirements. For example, in one embodiment, the recycling device 200 may include only one recycling module 52, and the recycling module 52 is urged to move across the pending section 910 in the processing direction 803 between the first and second positions to conduct the physical recycling process. Equipment cost for the recycling device 200 may thus be reduced.

Furthermore, in one embodiment, the speed at which the discharge conveying unit 452 conveys the remainder section 920 of the solar panel 900 may be the same as the speed at which the feed conveying unit 451 conveys the solar panel 900.

Moreover, in one embodiment, the connecting seat 528 may be fixedly mounted to the moving seat 513. Each of the guide rods 526 may not be movable relative to the base seat 520 and the connecting seat 528 in the cutter-moving direction 802. Each of the guide rods 526 may extend through the cutter seat 521 in the cutter-moving direction 802 while the cutter seat 521 may be movable relative to the guide rods 526 in the cutter-moving direction 802. The threaded rod 527 may not be movable relative to the base seat 520 and the connecting seat 528 in the cutter-moving direction 802, and the bottom end thereof may be threadedly connected to the cutter seat 521 while the cutter seat 521 may be movable relative to the threaded rod 527 in the cutter-moving direction 802. Consequently, when the threaded rod 527 is driven to turn, the cutter seat 521 moves relative to the guide rods 526 and the threaded rod 527 in the cutter-moving direction 802 and urges the cutter unit 522 to move between the cutter-retraction position and the cutter-extension position. Since the mechanism for urging the cutter seat 521 and the cutter unit 522 to move in the cutter-moving direction 802 via the cutter driving unit 524 may be conducted in a variety of forms, the structures of the cutter driving unit 524, the cutter seat 521, and the cutter unit 522 may not be limited to the aforementioned structures.

As illustrated, with the conveying module 45 and the carriage module 46 of the feeding mechanism 4, and the recycling driving module 51 and the recycling modules 52 of the recycling mechanism 5, the physical recycling process for recycling the solar panel 900 of the solar cell module may be conducted, in the stepwise manner or the continuous manner, and the physical recycling process may be conducted on the pending section 910 layer-by-layer to sequentially recycle the back plate 903, the adhesive 904, and the silicon plates 902, thereby obtaining the layer of the complete cover glass plate 901. In addition, in comparison with a conventional recycling device, a length of the recycling device 200 in the front-rear direction (i.e., the conveying direction 801) may thus be relatively short.

By virtue of the recycling device 200 including a plurality of the recycling modules 52 that synchronously and respectively conduct the physical recycling process on different areas of the pending section 910, the time needed for the physical recycling process may be shortened.

Moreover, by virtue of the carriage module 46 sucking the pending section 910 of the solar panel 900 to position the pending section 910, even if the cover glass plate 901 of the solar panel 900 has cracked, the recycling device 200 may still be adapted for conducting the physical recycling process for recycling the solar panel 900.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A recycling device adapted for recycling a solar panel of a solar cell module, comprising:

a frame mechanism defining a recycling zone therein;

a feeding mechanism mounted to the frame mechanism, and including a conveying module that is operable to convey the solar panel through the recycling zone and that is operable to cease to convey the solar panel, and a carriage module that is disposed in the recycling zone, the carriage module being adapted for carrying a pending section of the solar panel that is located in the recycling zone, the carriage module being operable to position the pending section of the solar panel and to urge the pending section of the solar panel to abut thereagainst when the conveying module ceases to convey the solar panel; and a recycling mechanism mounted to the frame mechanism, and including at least one recycling module that is operable to conduct a physical recycling process for recycling the solar panel, and a recycling driving module that is connected to the at least one recycling module, the at least one recycling module being operable to move from a cutter-retraction position, in which the at least one recycling module is distal from the carriage module, to a cutter-extension position, in which the at least one recycling module is proximate to the carriage module and abuts against the pending section of the solar panel, when the at least one recycling module is in the cutter-extension position, the recycling driving module being operable to drive the at least one recycling module to move in a processing direction so that the at least one recycling module is further movable between a first position and a second position to conduct the physical recycling process for recycling the pending section of the solar panel;

wherein the pending section of the solar panel is defined as a remainder section of the solar panel after the physical recycling process, and the carriage module is operable to release the remainder section of the solar panel.

2. The recycling device as claimed in claim 1, wherein the carriage module has a plurality of suction holes that open toward the pending section of the solar panel, and is operable to discharge air in the recycling zone via the suction holes at negative air pressure so that the pending section of the solar panel is urged to abut against the carriage module.

3. The recycling device as claimed in claim 1, wherein the recycling driving module includes a slide rail unit that is mounted to the frame mechanism, a moving seat that is mounted to the slide rail unit, and a first driving unit that is mounted to the frame mechanism and that is connected to the moving seat, the at least one recycling module being mounted to the moving seat, the slide rail unit being elongated in the processing direction, the first driving unit being operable to drive the moving seat to move along the slide rail unit in the processing direction so that the at least one recycling module mounted to the moving seat is urged to move between the first position and the second position.

4. The recycling device as claimed in claim 3, wherein the first driving unit includes a first driver, a guide rail that is mounted to the moving seat and that is elongated in a cutter-moving direction orthogonal to the processing direction, and a swing arm that is rotatably disposed between the first driver and the guide rail and that is rotatable about a rotation axis extending in a conveying direction, the conveying direction being orthogonal to the processing direction and the cutter-moving direction, the swing arm being driven by the first driver to rotate, when the swing arm rotates, one end of the swing arm moving along the guide rail in the cutter-moving direction to urge the guide rail to move in the processing direction so that the moving seat to which the guide rail is mounted is urged to move in the processing direction and that the at least one recycling module mounted to the moving seat is urged to move between the first position and the second position.

5. The recycling device as claimed in claim 4, wherein the at least one recycling module includes a base seat that is mounted to the moving seat, a cutter seat that is spaced apart from the base seat in the cutter-moving direction, a cutter unit that is mounted to the cutter seat and that is operable to conduct the physical recycling process for recycling the pending section of the solar panel, and a cutter driving unit that is disposed on the base seat and the cutter seat and that is operable to drive the cutter seat to move relative to the base seat in the cutter-moving direction so that the cutter seat urges the cutter unit to move between the cutter-retraction position and the cutter-extension position.

6. The recycling device as claimed in claim 5, wherein the at least one recycling module of the recycling mechanism includes a plurality of recycling modules that are mounted to the moving seat and that are spaced apart from each other in the processing direction.

7. The recycling device as claimed in claim 5, wherein the cutter driving unit of the at least one recycling module includes a guide subunit that is mounted to the base seat of the recycling module and that is movable relative to the base seat of the recycling module in the cutter-moving direction, a threaded rod that is elongated and extends through the base seat of the recycling module in the cutter-moving direction, and that is threadedly connected to the base seat of the recycling module, a connecting seat that is mounted to the guide subunit and the threaded rod, and a cutter driver that is mounted to the connecting seat and that is connected to the threaded rod, the cutter seat of the at least one recycling module interconnecting the guide subunit and the threaded rod of the recycling module, the cutter driver of the at least one recycling module being operable to drive the threaded rod of the recycling module to turn relative to the base seat of the recycling module so that the threaded rod of the recycling module moves relative to the base seat of the recycling module in the cutter-moving direction and urges the cutter seat and the cutter unit of the recycling module to move between the cutter-retraction position and the cutter-extension position.

8. The recycling device as claimed in claim 5, wherein the cutter driving unit of the at least one recycling module is operable to adjust the cutter-extension position of the cutter unit of the recycling module, thereby adjusting a distance between the cutter unit of the recycling module and the carriage module when the cutter unit of the recycling module is in the cutter-extension position.

9. The recycling device as claimed in claim 5, wherein the cutter unit of the at least one recycling module includes a cutter head that is operable to conduct the physical recycling process for recycling the pending section of the solar panel, the recycling mechanism further including a suction module, the suction module including an adjustment unit that is mounted to the moving seat, and a suction hood that is mounted to the adjustment unit and that has an opening, the adjustment unit is operable to urge the suction hood to move toward the carriage module in the cutter-moving direction so that the opening of the suction hood faces the carriage module and the suction hood covers the cutter head of the at least one recycling module, the suction hood being operable to discharge air via the opening thereof at negative air pressure.

10. The recycling device as claimed in claim 1, wherein the conveying module includes a feed conveying unit and a discharge conveying unit that are spaced apart from each other and that are disposed on two opposite sides of the carriage module in a conveying direction, the feed conveying unit being operable to convey the solar panel in the conveying direction, the discharge conveying unit being operable to convey the remainder section of the solar panel in the conveying direction.

11. The recycling device as claimed in claim 10, wherein the discharge conveying unit is adapted for pressing a top portion and a bottom portion of the remainder section of the solar panel to hold the remainder section while conveying the remainder section in the conveying direction, the feed conveying unit being adapted for pressing a top portion and a bottom portion of the solar panel to hold the solar panel while conveying the solar panel in the conveying direction, a speed at which the discharge conveying unit conveys the remainder section of the solar panel being greater than a speed at which the feed conveying unit conveys the solar panel.

12. The recycling device as claimed in claim 1, wherein the feeding mechanism further includes a feeding guide module that is adapted for carrying the solar panel and for guiding the solar panel to the conveying module in a conveying direction, and an orientation module, the orientation module being operable to push two opposite sides of the solar panel in the processing direction when the solar panel is carried by the feeding guide module for adjusting orientation of the solar panel.

13. The recycling device as claimed in claim 12, wherein the orientation module includes an orientation rail unit that is elongated in the processing direction, two orientation seats that are mounted to the orientation rail unit and that are movable relative to the orientation rail unit in the processing direction, and an orientation driving unit that interconnects the orientation seats, the orientation driving unit being operable to drive the orientation seats to move toward each other along the orientation rail unit, thereby pushing the opposite sides of the solar panel in the processing direction.

* * * * *